(12) United States Patent
Castellano (10) Patent No.: US 9,037,556 B2
(45) Date of Patent: May 19, 2015

(54) DISTRIBUTED, TRANSACTIONAL KEY-VALUE STORE

(71) Applicant: VMware, Inc., Palo Alto, CA (US)

(72) Inventor: Luca Castellano, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 353 days.

(21) Appl. No.: 13/692,777

(22) Filed: Dec. 3, 2012

(65) Prior Publication Data
US 2014/0156618 A1    Jun. 5, 2014

(51) Int. Cl.
*G06F 17/30*    (2006.01)

(52) U.S. Cl.
CPC .... *G06F 17/30587* (2013.01); *G06F 17/30348* (2013.01)

(58) Field of Classification Search
CPC ................. G06F 17/30227; Y10S 707/966
USPC .................. 707/636, 639, 648, 703
See application file for complete search history.

(56) References Cited

U.S. PATENT DOCUMENTS

| | | | |
|---|---|---|---|
| 6,078,930 A * | 6/2000 | Lee et al. .......................... | 1/1 |
| 7,406,489 B2 * | 7/2008 | Soini et al. .................... | 707/610 |
| 8,473,582 B2 * | 6/2013 | Ananthanarayanan et al. ........................ | 709/218 |
| 8,510,263 B2 * | 8/2013 | Essawi et al. ................. | 707/607 |
| 8,700,842 B2 * | 4/2014 | Dinker .......................... | 711/103 |
| 2009/0193397 A1 * | 7/2009 | Chithambaram et al. ..... | 717/128 |
| 2012/0102298 A1 | 4/2012 | Sengupta et al. | |
| 2012/0290547 A1 | 11/2012 | Kamimura et al. | |
| 2013/0110767 A1 * | 5/2013 | Tatemura et al. .............. | 707/607 |
| 2013/0290243 A1 * | 10/2013 | Hazel et al. ................... | 707/607 |

OTHER PUBLICATIONS

International Search Report and Written Opinion dated Nov. 14, 2013 from International Application No. PCT/US2013/058181 filed Sep. 5, 2013, 12 pages.
Schutt et al., "Scalaris: Reliable Transactional P2P Key/Value Store", Zuse Institute Berlin and onScale Solutions, Jan. 1, 2008, XP055074717, Victoria, BC, Canada, 8 pages.
Padhye et al., "Scalable Transaction Management with Snapshot Isolation on Cloud Data Management Systems", 2012 IEEE Fifth International Conference on Cloud Computing, Jun. 24, 2012, pp. 542-549.
Das et al., "G-Store: A Scalable Datastore for Transactional Multi Key Access in the Cloud", Proceedings of the 1st ACM Symposium on Cloud Computing, SOCC 2010, Jan. 1, 2010, p. 163-174.

(Continued)

*Primary Examiner* — Cheryl Lewis (57) ABSTRACT

In one embodiment, a system for implementing a distributed, transactional key-value store is provided. The system includes a set of nodes, where each node is communicatively coupled with one or more storage devices storing a set of data log files, and where each data log file including key-value pairs for a key namespace. Each node is configured to execute, using a transaction log file specific to the node, transactions for modifying or retrieving key-value pairs in the set of data log files, where the transaction log file includes state information for the transactions. The transactions are executed in a manner that ensures the atomicity and durability of each transaction.

20 Claims, 6 Drawing Sheets

(56) References Cited

OTHER PUBLICATIONS

Zhang et al., "Supporting Multi-Row Distributed Transactions with Global Snapshot Isolation Using Bare-Bones HBase", Grid Computing, 2010 11th IEEE/ACM International Conference Oct. 25, 2010, pp. 177-184.

Yair Sovran et al., "Transactional Storage for Geo-Replicated Systems", available at http://research.microsoft.com/en-us/people/aguilera/walter-sosp2011.pdf, accessed Jul. 27, 2012.

* cited by examiner

DISTRIBUTED, TRANSACTIONAL KEY-VALUE STORE

BACKGROUND

A key-value store is a type of database that allows users to store and retrieve data in the form of key-value pairs. The key in a key-value pair is an index (e.g., number, string, etc.) that uniquely identifies its paired value. The value in a key-value pair can be any type of data object or collection of data objects. A typical key-value store exposes three operations to users: PUT, GET, and DELETE. The PUT operation stores one or more specified key-value pairs in the key-value store, the GET operation retrieves the values for one or more specified keys from the key-value store, and the DELETE operation deletes key-value pairs identified by one or more specified keys from the key-value store.

Some key-value stores are distributed in nature; in other words, they allow users to invoke key-value operations such as PUT, GET, and DELETE, on any one of a set of distinct computers (either physical or virtual) referred to as nodes. Such distributed key-value stores offer enhanced fault tolerance and scalability over non-distributed key-value stores. However, due to their decentralized nature, distributed key-value stores cannot easily provide transactional guarantees (e.g., guarantees of atomicity, durability, isolation, etc.) with respect to the execution of key-value operations.

SUMMARY

In one embodiment, a system for implementing a distributed, transactional key-value store is provided. The system includes a set of nodes, where each node is communicatively coupled with one or more storage devices storing a set of data log files, and where each data log file includes key-value pairs for a key namespace. Each node is configured to execute, using a transaction log file specific to the node, transactions for modifying or retrieving key-value pairs in the set of data log files, where the transaction log file includes state information for the transactions. The transactions are executed in a manner that ensures the atomicity and durability of each transaction.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Particular embodiments relate to a distributed, transactional key-value store, or "DTKV store." The DTKV store can include a set of nodes and can execute, on each node, key-value operations (e.g., PUT, GET, DELETE, etc.) that enable users to store and retrieve data in the form of key-value pairs. Unlike traditional distributed key-value stores, the DTKV store can execute these operations in a manner that guarantees the satisfaction of certain transactional properties (e.g., atomicity, durability, and per-node-snapshot isolation).

In one embodiment, the DTKV store can employ a data configuration that includes a set of data log files and a set of transaction log files. The set of data log files can be shared among the nodes of the DTKV store (e.g., can be readable and writable by each node), and can store the actual key-value pairs maintained by the DTKV store. Each transaction log file in the set of transaction log files can be specific to a particular node in the DTKV store (e.g., can be readable and writable by that node, but only readable by other nodes), and can keep track of the state of transactions executed by that node. As described in detail below, the DTKV store can interact with these data log files and transaction log files at the time of executing key-value operations to provide transactional guarantees in an efficient and scalable manner.

In a further embodiment, the DTKV store can enable users to efficiently search for keys and/or key-value pairs that are maintained by the DTKV store. In this embodiment, the DTKV store can partition keys into one or more key namespaces and store the key-value pairs for each key namespace in one or more separate data log files. The DTKV store can then allow users to search (via a SEARCH operation) for keys and/or key-value pairs by key namespace. When a user invokes the SEARCH operation in the context of a particular key namespace, the DTKV store can restrict its searching to the contents of the data log file(s) associated with that key namespace (rather than having to search all of the data log files in the DTKV store).

I. System Implementation

Figure 1:
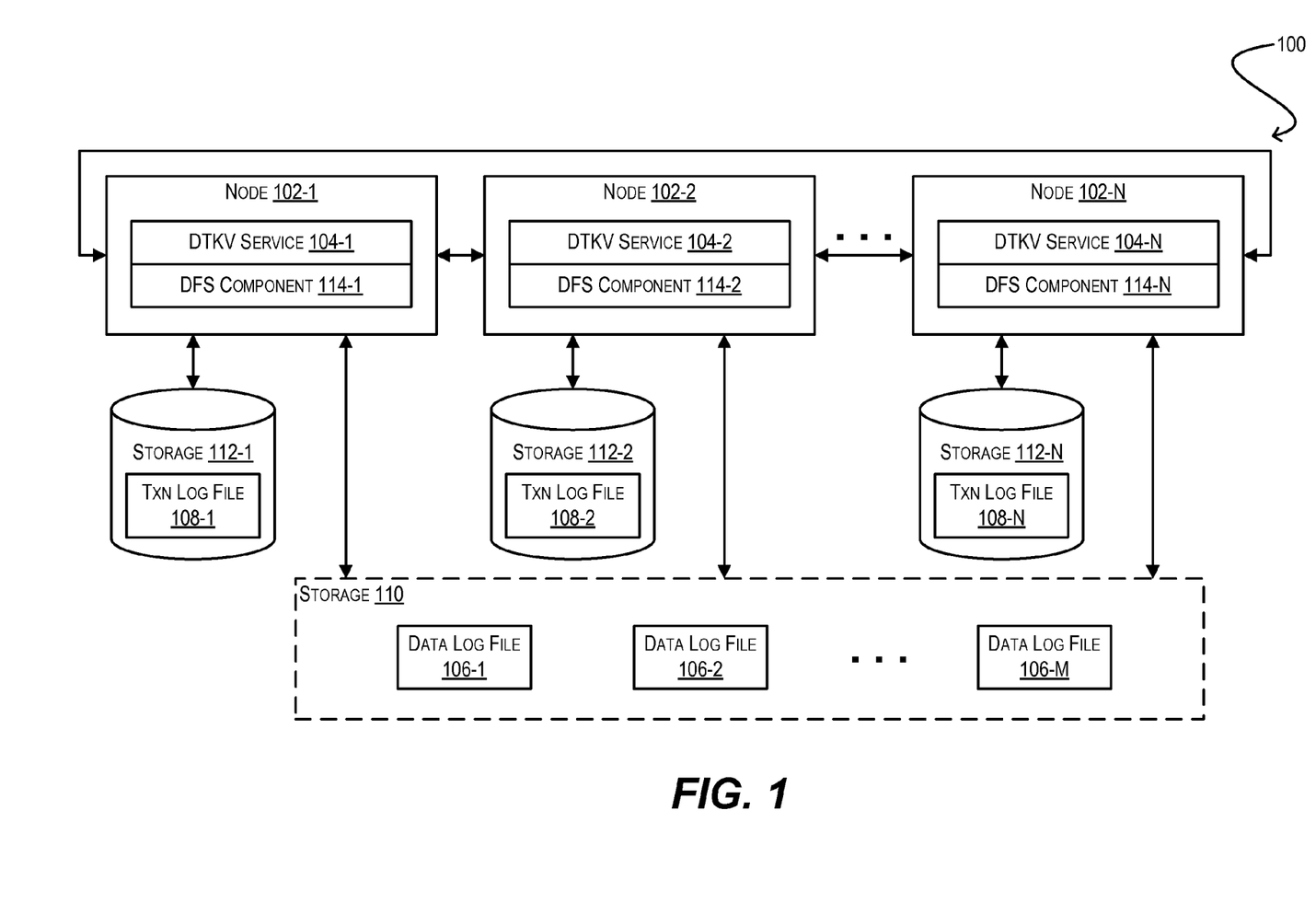
FIG. 1 illustrates a system implementation of a distributed, transactional key-value store according to one embodiment.

FIG. 1 illustrates a system implementation of a DTKV store 100 according to one embodiment. As shown, DTKV store 100 includes a set of interconnected nodes 102-1 to 102-N. Nodes 102-1 to 102-N can represent physical computing devices (e.g., a server computer system, personal (e.g., desktop or laptop) computer system, etc.), virtual machines (VMs), or a combination of physical and virtual devices. Nodes 102-1 to 102-N can be interconnected via any type of computer network known in the art, such as a local area network (LAN), a wide area network (WAN), or the Internet.

I.A. DTKV Services

Each node 102-1 to 102-N in DTKV store 100 includes a distributed, transactional key-value service, or "DTKV service" (104-1 to 104-N). DTKV services 104-1 to 104-N are software and/or hardware-based components that carry out the main processing tasks of DTKV store 100. For example, each DTKV service 104-1 to 104-N can expose, to one or more users (e.g., either humans or automated/programmatic agents), operations for storing, retrieving, and searching for key-value pairs in DTKV store 100. Upon receiving a user invocation of a particular operation, DTKV service 104-1 to 104-N can execute the operation and return a response (if appropriate) to the user. In one embodiment, DTKV services 104-1 to 104-N can expose the following operations:

(1) PUT((key1, value1), (key2, value2), . . .)—Stores one or more specified key-value pairs.

(2) GET(key1, key2, . . .)—Retrieves one or more key-value pairs corresponding to one or more specified keys.

(3) DELETE(key1, key2, . . .)—Deletes one or more key-value pairs corresponding to one or more specified keys.

(4) SEARCH(namespace, search expression)—Searches for keys and/or key-value pairs in the specified key namespace that satisfy the specified search expression (e.g., a regular expression).

Generally speaking, each DTKV service 104-1 to 104-N can operate independently of, and concurrently with, the other DTKV services in DTKV store 100. For instance, DTKV service 104-1 of node 102-1 can process invocations of a first set of PUT, GET, DELETE, and/or SEARCH operations received from, e.g., a first set of users. At substantially the same time, DTKV service 104-2 of node 102-2 can process invocations of a second set of PUT, GET, DELETE, and/or SEARCH operations received from, e.g., a second set of users, without any dependence on the processing performed by DTKV service 104-1. This distributed, parallel processing model allows DTKV store 100 to be fault tolerant—if one node and/or DTKV service becomes unavailable, users can still access DTKV store 100 via one of the other available nodes/DTKV services. Further, this distributed, parallel processing model allows DTKV store 100 to be scalable, since a system administrator can add additional nodes (each running an additional DTKV service) to DTKV store 100 as needed to handle additional user load.

I.B. Transactional Properties

Unlike traditional distributed key-value stores, DTKV store 100 is transactional; in other words, DTKV store 100 can ensure/guarantee that certain transaction properties are satisfied when DTKV services 104-1 to 104-N execute key-value operations. An instance of a key-value operation that satisfies (or is intended to satisfy) such transactional properties is referred to as a transaction. In a particular embodiment, DTKV store 100 can guarantee the transactional properties of atomicity, durability, and per-node-snapshot isolation.

Atomicity is a transactional property that, in one embodiment, requires all elements of a transaction to complete successfully, or to fail (e.g., be aborted), as a single, indivisible group. This is known as an "all-or-nothing" property, since it does not allow a transaction to execute partially. For example, consider an instance of a PUT operation (i.e., transaction) that stores three key-value pairs (K1, V1), (K2, V2), and (K3, V3). The atomicity property requires that all three of these key-value pairs are committed (e.g., written to disk) together, or are not committed at all.

Durability is a transactional property that, in one embodiment, requires all changes (e.g., modifications, deletions) that are committed as a result of a transaction be persistent; in other words, the committed changes should not be undone due to, e.g., power loss, crashes, or other system errors.

Per-node-snapshot isolation is a transactional property that, in one embodiment, requires each transaction running on DTKV store 100 to be isolated from other, concurrent transactions. In other words, a transaction that satisfies this property operates in an environment that makes it appear as if no other users are concurrently accessing or modifying key-value pairs in DTKV store 100. Thus, the content of DTKV store 100 can be considered "frozen" at the time the transaction is started, and partial changes made by other transactions should not be visible.

For example, assume DTKV service 104-1 begins execution of a first PUT transaction that stores key-value pairs (K1, V1) and (K2, V2) and, at substantially the same time, DTKV service 104-2 begins execution of a second PUT transaction that stores key-value pairs (K1, V3) and (K2, V4). Under the property of per-node-snapshot isolation, DTKV store 100 should contain, at the conclusion of these transactions, either (K1, V1) and (K2, V2) (indicating a serialized execution order of second PUT transaction→first PUT transaction) or (K1, V3) and (K2, V4) (indicating a serialized execution order of first PUT transaction→second PUT transaction). An end state of, e.g., (K1, V1) and (K2, V4), is not valid, since the end state reflects partial execution of the first PUT transaction and partial execution of the second PUT transaction.

As another example, consider a situation where DTKV service 104-1 begins execution of a PUT transaction that inserts two new key-value pairs (K1, V1) and (K2, V2) and, at substantially the same time, DTKV service 104-2 begins execution of a GET operation for reading the values of keys K1 and K2. Assume that there is a relatively long pause after the insertion of (K1, V1) but before the insertion of (K2, V2) begins. There are three potential results in this scenario:

1) DTKV service 104-2 does not find any values for either K1 and K2

2) DTKV service 104-2 finds the value V1 for K1 but does not find any value for K2

3) DTKV service 104-2 find the value V1 for K1 and the value V2 for K2

Of these three possible outcomes, only (1) and (3) satisfies the property of per-node-snapshot isolation where DTKV store 100 appears frozen to DTKV service 104-2 at the time the GET transaction is started.

To achieve the above, per-node-snapshot isolation can include three sub-requirements. The first sub-requirement specifies that concurrent transactions cannot modify the same data (e.g., the same key-value pairs). If such a situation arises, one of the concurrent transactions must be aborted. In the example above that involves the execution of two simultaneous PUT transactions, either the first PUT transaction or the second PUT transaction would be aborted under this sub-requirement because they both attempt to modify the same keys K1 and K2. This avoids an end state of DTKV store 100 that reflects partial execution of one or both transactions.

The second sub-requirement is that a GET transaction executing concurrently with a PUT transaction and operating on the same set of keys should return a set of values that are include either all the modifications of the PUT transaction or none. This requirement is called read isolation.

The third sub-requirement requires that each node in the DTKV store 100 maintain a unique commit order for all transactions originating from (i.e., executing on) that node. Thus, in the embodiment of FIG. 1, this third sub-requirement requires that node 102-1 maintain a unique commit order for all transactions (e.g., instances of PUT, GET, DELETE, etc.) that DTKV service 104-1 executes, node 102-2 maintain a unique commit order for all transactions that DTKV service 104-2 executes, and so on. It should be noted that this is different from the more stringent transactional property of "snapshot" isolation, which requires that all transactions in a distributed system (in other words, transactions across all nodes) be fully ordered (i.e., organized according to a single, unique commit order).

By ensuring that the foregoing transactional properties are satisfied, DTKV store 100 can make certain that its repository of key-value pairs is maintained in a consistent fashion, regardless of concurrent invocations of key-value operations across nodes 102-1 to 102-N, and regardless of equipment (e.g., node or storage device) failures. This enables users to reliably interact with DTKV store 100 without worrying about race conditions, dirty reads, partial writes, and other known issues than can arise from non-transactional processing.

I.C. Data Configuration

In certain embodiments, DTKV store 100 can employ a data configuration that includes two types of files: data log files (106-1 to 106-M) and transaction ("txn") log files (108-1 to 108-N). As described in Section II below, DTKV services 104-1 to 104-N can manipulate these data log files and transaction log files at the time of executing PUT, GET, and DELETE transactions to guarantee the atomicity, durability, and per-node-snapshot isolation of each transaction.

In the embodiment of FIG. 1, data log files 106-1 to 106-M are depicted as being stored in a central storage device 110 (hosted on, e.g., a dedicated storage server), and transaction log files 108-1 to 108-N are depicted as being stored in local storage devices 112-1 to 112-N of nodes 102-1 to 102-N respectively. However, it should be appreciated that data log files 106-1 to 106-M and transaction log files 108-1 to 108-N can be stored in any storage device or combination of storage devices that are accessible, via either local or remote connection, to nodes 102-1 to 102-N.

I.C.1. Data Log Files

Data log files 106-1 to 106-M store the actual key-value pairs maintained by DTKV store 100. Each data log file 106-1 to 106-M can be shared across DTKV services 104-1 to 104-N such that it is readable and writable by each DTKV service. In some embodiments, each data log file 106-1 to 106-M can be associated with a predefined key namespace. In one embodiment, there can be a one-to-one mapping between key namespaces and data log files, such all of the key-value pairs belonging to a particular key namespace are stored in a single data log file. For example, data log file 106-1 can be associated with a first key namespace that includes the names of employees of a sales department; data log file 106-2 can be associated with a second key namespace that includes the names of employees of a marketing department, and so on. In another embodiment, there can be a one-to-many mapping between key namespaces and data log files, such that the keys in a particular key namespace can be stored across multiple data log files. In either case, each data log file 106-1 to 106-M will generally only store key-value pairs that are within the scope of the data log file's associated key namespace. This partitioning of data log files by key namespace can facilitate the process of searching for keys and/or key-value pairs in DTKV store 100, which is described in Section III below.

Each data log file 106-1 to 106-M can be organized as an array or list of entries referred to as data log entries. DTKV services 104-1 to 104-N will create these data log entries as they execute "modifier" transactions (i.e., PUT and DELETE transactions) that modify the key-value contents of DTKV store 100. A data log entry can be one of two types: a PUT data log entry that indicates the storage of a key-value pair in DTKV store 100, and a DELETE data log entry that indicates the deletion of a key-value pair from DTKV store 100. Each PUT data log entry can include "key" and "value" fields that identify the key and value being stored, while each DELETE data log entry can include a single "key" field that identifies the key of the key-value pair being deleted. Further, each data log entry (either PUT or DELETE) can include a "node" field that identifies the host node (e.g., 102-1 to 102-N) of the DTKV service that created the data log entry, and a transaction identifier ("txnID") field that identifies the transaction that caused the node to create the data log entry.

By way of example, consider the data log entry "PUT key:K1 value:V1 node:N1 txnID:T1." This data log entry indicates that a PUT transaction having a transaction ID of T1 was executed on node N1, and the PUT transaction caused key-value pair (K1, V1) to be stored. As another example, consider the data log entry "DELETE key:K1 node:N2 txnID:T2." This data log entry indicates that a DELETE transaction having a transaction ID of T2 was executed on node N2, the DELETE transaction caused the key-value pair identified by key K1 to be deleted.

In certain embodiments, DTKV services 104-1 to 104-N are configured such that they only append (e.g., via an atomic "append" operation) new data log entries to the end of each data log file 106-1 to 106-M; DTKV services 104-1 to 104-N cannot insert new data log entries at the start or middle of a data log file, or modify existing data log entries in a data log file. In these embodiments, each data log file 106-1 to 106-M can include multiple data log entries for the same key, and the last (i.e., most recent) data log entry for a given key in the data log file will determine the current value for that key. For instance, consider the following exemplary data log file:

PUT key:K1 value:V1 node:N1 txnID:T1
PUT key:K1 value:V2 node:N2 txnID:T2
DEL key:K1 node:N3 txnID:T4
PUT key:K1 value:V3 node:N1 txnID:T5

In this example, all four data log entries pertain to key K1. However, since the data log entries are ordered chronologically from top to bottom (due to the "append" restriction noted above), the last data log entry determines the current value of key K1, which is V3. The older data log entries can be considered historic entries that have been superseded by the last data log entry.

In further embodiments, DTKV services 104-1 to 104-N are configured such they access/modify data log files 106-1 to 106-M in the context of file versions. In other words, each data log file 106-1 to 106-M is associated with a version number, and DTKV services 104-1 to 104-N specify a version number when accessing a data log file, as well as increment a data log file's version number when modifying the data log file.

I.C.2. Transaction Log Files

Transaction log files 108-1 to 108-N store state information regarding transactions that are executed by DTKV services 104-1 to 104-N. In certain embodiments, each transaction log file 108-1 to 108-N can be specific to (i.e., associated with) a particular node/DTKV service in DTKV store 100. For example, transaction log file 108-1 can be specific to node 102-1/DTKV service 104-1, transaction log file 108-2 can be specific to node 102-2/DTKV service 104-2, and so on. In these embodiments, each transaction log file 108-1 to 108-N may only be written to by its associated DTKV service, and will only store state information regarding transactions that are initiated/executed by that DTKV service. Other, un-associated DTKV services can read (but not write) the transaction log file.

Each transaction log file 108-1 to 108-N can be organized as an array or list of entries referred to as transaction log entries. The DTKV service associated with a given transaction log file will create these transaction log entries as the DTKV service executes modifier transactions that modify the key-value contents of DTKV store 100. A transaction log entry can be one of three types: a BEGIN transaction log entry that indicates the start of a modifier transaction, a COMMIT transaction log entry that indicates the successful completion of a modifier transaction, and an ABORT transaction log entry that indicates the unsuccessful completion of a modifier transaction. Each of these three types of transaction log entries can include a "node" field that identifies the host node (e.g., 102-1 to 102-N) of the DTKV service that initiated the transaction (and thus created the transaction log entry), and a transaction identifier ("txnID") field that uniquely identifies the transaction within the context of a given node the combination of the "node" field and the "txnID" field can be unique across all nodes in DTKV store 100.

In one embodiment, the transaction identifier field can be unique across all nodes 102-1 to 102-N of DTKV store 100. In alternative embodiments, the transaction identifier field can be unique only in the context of a single node.

As with data log files 106-1 to 106-M, DTKV services 104-1 to 104-N can be configured such that they only append (e.g., via an atomic "append" operation) new transaction log entries to the end of each transaction log file 108-1 to 108-N; DTKV services 104-1 to 104-N cannot insert new transaction log entries at the start or middle of a transaction log file, or modify existing transaction log entries in a transaction log file. In these embodiments, a transaction log file can include up to two transaction log entries for the same transaction ID (one BEGIN transaction log entry and one COMMIT or ABORT transaction log entry), and the last (i.e., most recent) transaction log entry for a particular transaction ID will determine the current state of that transaction. For instance, consider the following exemplary transaction log file:

BEGIN txnID:T1 node:N1
BEGIN txnID:T2 node:N2
COMMIT txnID:T1 node:N1

In this example, there are two transaction log entries for a transaction identified by transaction ID T1, and one transaction log entry for a transaction identified by transaction ID T2. The last transaction log entry for transaction T1 is a COMMIT entry, indicating that transaction T1 has completed successfully. On the other hand, the last transaction log entry for transaction T2 is a BEGIN entry, indicating that transaction T2 is still in progress.

Further, as with data log files 106-1 to 106-M, DTKV services 104-1 to 104-N are configured such they access/modify transaction log files 108-1 to 108-N in the context of file versions. In other words, each transaction log file 108-1 to 108-N is associated with a version number, and DTKV services 104-1 to 104-N specify a version number when accessing a transaction log file, as well as increment a transaction log file's version number when modifying the transaction log file.

I.C.3. Log File Compaction

One potential issue with appending data log entries and transaction log entries to data log files 106-1 to 106-M and transaction log files 108-1 to 108-N respectively is that these log files can increase indefinitely in size. To address this, in certain embodiments, a "compacting" process (hosted on, e.g., one of nodes 102-1 to 102-N or another device not shown in FIG. 1) can analyze each data log file and transaction log file to remove log entries that are no longer needed. For instance, in the example data log file above, the compacting process can safely remove the first three data log entries since they no longer affect the current value of key K1. Further, in the example transaction log file above, the compacting process can safely remove the two transaction log entries that reference transaction T1 since this transaction has been committed. Thus, the compacting process can prevent data log files 106-1 to 106-M and transaction log files 108-1 to 108-N from growing unmanageably large. In one embodiment, the compacting process can run at predefined time intervals that are defined by, e.g., an administrator of DTKV store 100. In another embodiment, the compacting process can run in response to a trigger event, such the growth of a particular data log file or transaction log file beyond a predetermined threshold size. In yet another embodiment, the compacting process can be performed incrementally as a low-priority (i.e., background) process during runtime of node 102-1 to 102-N. In this latter case, low-priority log file compaction can be initiated when, e.g., the data log file grows beyond a relatively small size.

I.D. Distributed File System

As shown in FIG. 1, each node 102-1 to 102-N includes, in addition to a DTKV service 104-1 to 104-N, an associated distributed file system ("DFS") component 114-1 to 114-N. Each DFS component 114-1 to 114-N can provide, to its associated DTKV service 104-1 to 104-N, various file system-level functions that facilitate access to, and modification of, data log files 106-1 to 106-M and transaction log files 108-1 to 108-N.

For example, as noted in Sections I.C.1 and I.C.II above, in certain embodiments DTKV services 104-1 to 104-N rely on (1) file versioning to create/access different versions of data/transaction log files, and (2) an atomic "append" operation to append data/transaction log entries to data/transaction log files. Rather that implementing (1) and (2) directly into DTVK services 104-1 to 104-N, DFS components 114-1 to 114-N can efficiently implement these (and other) functions at the file system level and expose the functions via one or more application programming interfaces ("APIs"). Accordingly, in these embodiments, DTKV services 104-1 to 104-N need only invoke the APIs provided by DFS components 114-1 to 114-N in order to interact with data log files 106-1 to 106-M and transaction log files 108-1 to 108-N in the manner described above.

In a particular embodiment, each DFS component 114-1 to 114-N can expose the following APIs:

(1) GetVersion(file)—Returns the current version number of the specified file.

(2) Read(file, outVersion, offset, length)—Returns data for the specified file starting at the specified offset and length, as well as the current version number of the file.

(3) Append(file, in Version)—Appends data to the end of the specified file, if and only if the current version number of the file matches the value of the parameter in Version; if the current version number does not match in Version an error is returned and no data is appended. In addition, the append operation is atomic; in other words, either all of the data is appended or no data is appended. If it the data is appends, it can be considered durable (i.e., saved to non-volatile storage).

(4) Rename(file1, file2)—Renames file1 to file2 in a single, atomic operation; this also changes the current version number of the file.

The ways in which DTKV services 104-1 to 104-N can use the foregoing DFS APIs to manipulate data log files 106-1 to 106-M and transaction log files 108-1 to 108-N are disclosed in the sections that follow.

II. Transactional Algorithms

With the foregoing system implementation of DTKV store 100 in mind, the following sections describe various algorithms that DTKV services 104-1 to 104-N can implement to execute key-value transactions (e.g., PUT, GET, and DELETE) in a transactionally consistent fashion.

II.A. Modifier Transactions

Figure 2:
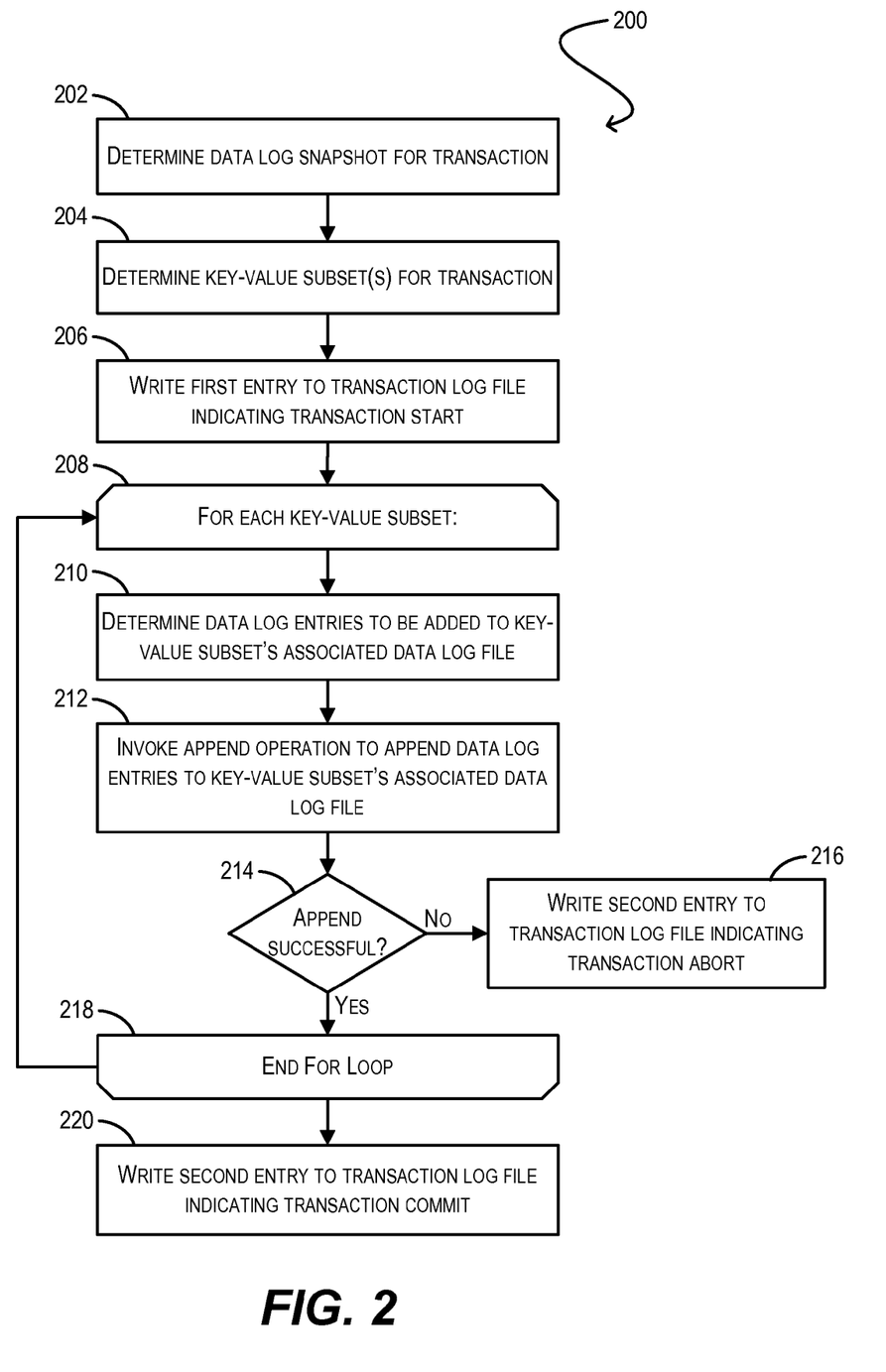
FIGS. 2 and 3 illustrate processes for executing a modifier (e.g., PUT and DELETE) transaction according to various embodiments.

FIG. 2 illustrates a process 200 that can be performed by any DTKV service of DTKV store 100 (hereinafter "DTKV service 104-X") for executing a modifier (PUT or DELETE) transaction in accordance with one embodiment. With this algorithm, DTKV service 104-X can ensure that the transactional properties of atomicity, durability, and per-node-snapshot isolation are satisfied for the modifier transaction.

At block 202, DTKV service 104-X can determine a data structure referred to as a "data log snapshot" for the modifier transaction. In one embodiment, the data log snapshot can include references to all of the data log files in DTKV store 100 that DTKV service 104-X will access (e.g., either read or write) as a result of the transaction. For example, assume the modifier transaction is a PUT transaction T1 for storing key-value pairs (K1, V1) and (K2, V2), where K1 is stored in data log file 106-1 and K2 is stored in data log file 106-2. In this example, the data log snapshot will include references to both data log file 106-1 and data log file 106-2, since DTKV service 104-X will modify both files upon successful completion of the transaction. In addition to including references to data log files, the data log snapshot can also include, for each data log file, the data log file's version number and size at the start of the modifier transaction.

At block 204, DTKV service 104-X can determine one or more key-value subsets for the modifier transaction. In one embodiment, these key-value subsets can correspond to groups of key-value pairs that are identified by the modifier transaction, partitioned by data log file. Thus, for example transaction T1, DTKV service 104-X can determine two key-value subsets: a first key-value subset that includes key-value pair (K1, V1) and a second key-value subset that includes key-value pair (K2, V2). In this example, key-value pairs (K1, V1) and (K2, V2) are included in separate key-value subsets because they reside in separate data log files (106-1 and 106-2 respectively).

At block 206, DTKV service 104-X can write a first transaction log entry to its associated transaction log file (e.g., transaction log file 108-X) indicating that the modifier transaction has been initiated. In a particular embodiment, the first transaction log entry can be a BEGIN transaction log entry that identifies the modifier transaction by transaction ID (e.g., T1) and the node that initiated the transaction (e.g., the host node of DTKV service 104-X—node 102-X). As part of block 206, DTKV service 104-X can generate a transaction ID for the modifier transaction if the transaction does not already have one. In certain embodiments, DTKV service 104-X can write the first transaction log entry by appending the entry to the end of transaction log file 108-X. DTKV service 104-X can accomplish this by invoking the atomic "append operation" exposed by its associated DFS component (e.g., DFS component 114-X).

Once DTKV service 104-X has written the first transaction log entry, DTKV service 104-X can enter a loop for each key-value subset determined at block 204 (block 208). Within this loop, DTKV service 104-X can first determine one or more data log entries that DTKV service 104-X will add (in view of the current key-value subset) to the current key-value subset's associated data log file (block 210). For instance, with respect to example transaction T1, if the current key-value subset includes key-value pair (K1, V1), DTKV service 104-X can determine the following data log entry: "PUT key:K1 value:V1 node:102-X txnID:T1."

DTKV service 104-X can then write the data log entries determined at block 210 to the current key-value subset's associated data log file (block 212). As with the first transaction log entry written at block 206, DTKV service 104-X can write these data log entries to the data log file by invoking the atomic append operation exposed by DFS component 114-X. As part of this invocation, DTKV service 104-X can pass, to the append operation, the version number of the data log file as saved in the data log snapshot (which corresponds to the version number of the data log file at the start of the transaction).

At block 214, DTKV service 104-X can determine whether the append operation was successful. As noted in Section I.D., the append operation exposed by DFS component 114-X is designed to complete successfully if the version number passed into the operation matches the version number of the file being modified at the time of invoking the operation. Conversely, the append operation is designed to fail if the version numbers do not match. Thus, if DTKV service 104-X determines at block 214 that the append operation has failed, DTKV service 104-X can conclude that the data log file has been updated/modified (by, e.g., another concurrent transaction) since the start of the modifier transaction because the data log file's current version number no longer matches the passed-in version number from the data log snapshot. In this case, DTKV service 104-X can write a second transaction log entry to transaction log file 108-X (via the append operation exposed by DFS component 114-X) indicating that the modifier transaction has been aborted (e.g., an ABORT transaction log entry) and process 200 can terminate.

On the other hand, if DTKV service 104-X determines at block 214 that the append operation was successful, DTKV service 104-X can conclude that the data log file has not been updated/modified since the start of the modifier transaction because the data log file's current version number matches the passed-in version number from the data log snapshot. In this case, the current loop iteration can end (block 218) and process 200 can return to block 208 so that DTKV service 104-X can process additional key-value subsets. If DTKV service 104-X processes all key-value subsets successfully (i.e., if the data log entries for all key-value subsets are successfully appended to their associated data log files), DTKV service 104-X can write, at block 220, a second transaction log entry to transaction log file 108-X (via the append operation exposed by DFS component 114-X) indicating that the modified transaction has been committed (e.g., a COMMIT transaction log entry) and process 200 can subsequently end.

The algorithm of FIG. 2 can guarantee atomicity and durability for the subject modifier transaction because DTKV service 104-X either commits or aborts the modifier transaction at the last step of the algorithm (either block 216 or 220). As part of this last step, DTKV service 104-X invokes the append operation exposed by DFS component 114-X to write either a COMMIT or ABORT transaction log entry to transaction log file 108-X, and this append operation is guaranteed to be atomic and durable by DFS component 114-X as described in Section I.D. above. Thus, the transaction overall is guaranteed to be atomic and durable.

In some cases, DTKV service 104-X (or node 102-X) may crash before it can write a COMMIT or ABORT transaction log entry to transaction log file 108-X, but after it has written one or more data log entries to one or more data log files. However, as explained in Section II.B. below, the algorithms that DTKV services 104-1 to 104-N implement for executing retrieval (i.e., GET) transactions can ignore any data log entries in data log files 106-1 to 106-M that do not have a corresponding COMMIT transaction log entry in an appropriate transaction log file. Thus, even in this scenario, the interrupted modifier transaction can be considered be atomic since any modifications written to the data log files will be invisible to users without a COMMIT transaction log entry in transaction log file 108-X.

Further, the algorithm of FIG. 2 can ensure per-node-snapshot isolation of the subject modifier transaction in relation to other concurrent transactions. As noted with respect to blocks 212-216, if any data log file involved in the modifier transaction is changed (e.g., by another concurrent transaction) after the start the modifier transaction, the append operation that DTKV service 104-X invokes at block 212 will fail and the modifier transaction will be aborted. Accordingly, this result satisfies the first per-node-snapshot isolation requirement that two concurrent transactions cannot modify the same data. In addition, as explained in Section II.B. below, the algorithms that DTKV services 104-1 to 104-N implement for executing retrieval (i.e., GET) transactions can ignore any data log entries in data log files 106-1 to 106-M that do not have a corresponding COMMIT transaction log entry in an appropriate transaction log file, thus providing a view of DTKV store 100 that predates the state of concurrent modifier transactions. This property guarantees the second per-node-snapshot isolation requirement of read-isolation. Finally, note that a single transaction log file is associated with each node 102-1 to 102-N in DTKV store 100, where that single transaction log file includes a unique list of transaction log entries for all transactions originating from (i.e., executed on) its associated node. Accordingly, this data configuration satisfies the third per-node-snapshot isolation requirement of a unique commit order per node.

One issue with the algorithm of FIG. 2 is that, while it generates transactionally correct results, it can also unnecessarily prevent the concurrent execution of certain combinations of modifier transactions. For example, consider two PUT transactions T1 and T2 that act on disjoint sets of key-value pairs—e.g., transaction T1 is configured to store key-value pairs (K1, V1) and (K2, V2) and transaction T2 is configured to store key-value pairs (K3, V3) and (K4, V4). Assume that key K1 is stored in data log file D1, keys K2 and K3 are stored in data log file D2, and key K4 is stored in data log file D3. Thus, the data log snapshots of these two transactions intersect because they both contain data log file D2.

In this example, if transactions T1 and T2 are executed concurrently per process 200 of FIG. 2, one of the transactions will be aborted because the version number of data log file D2 will change (and thus the append operation at block 212 will fail) during the execution of one transaction or the other. However, neither transaction needs to be aborted from a transactional standpoint since they modify different key-value pairs, and thus there is no danger that T1 will partially overwrite T2 or vice versa.

Figure 3:
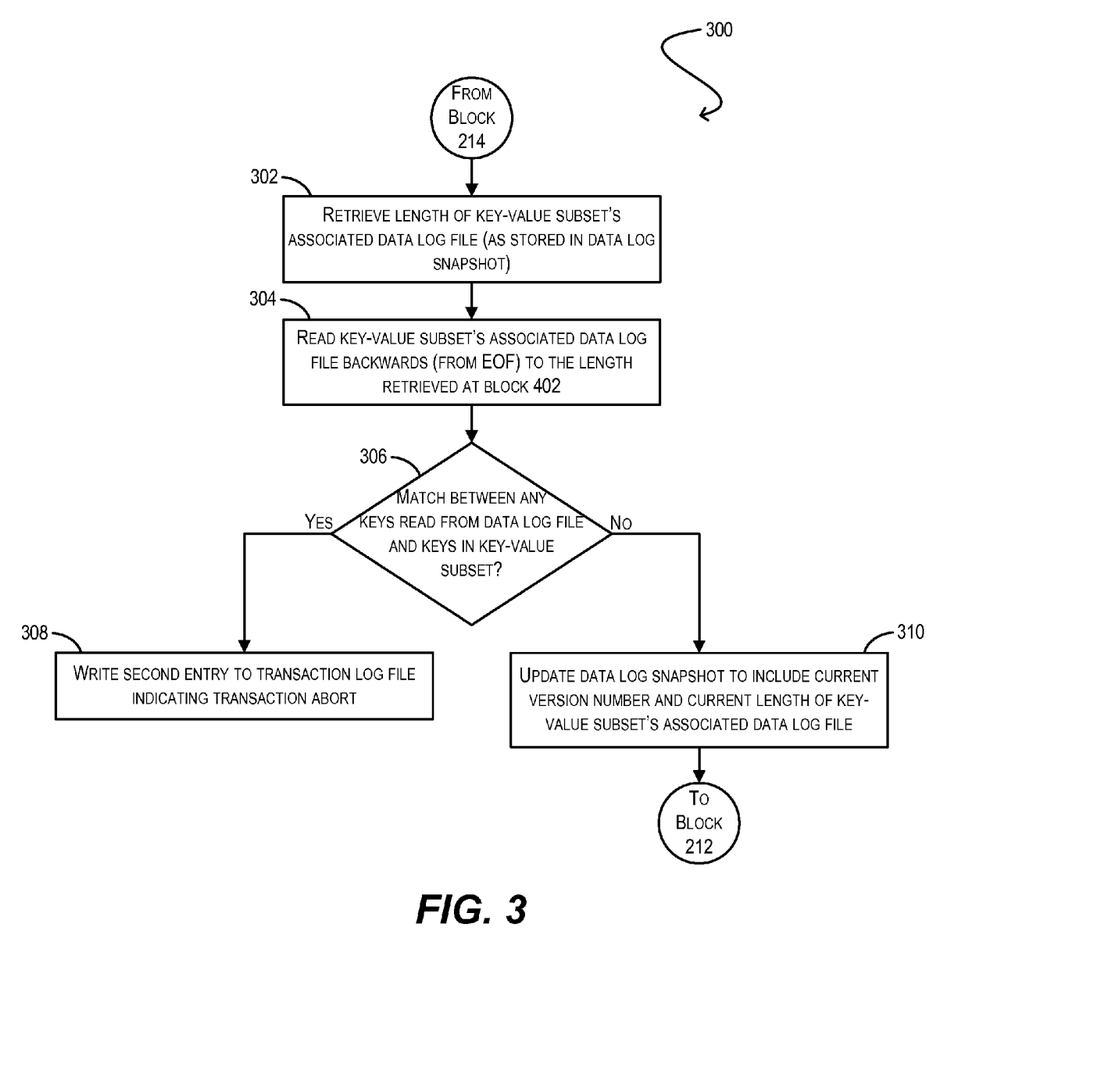

To address this issue, process 200 can be enhanced as shown in FIG. 3. In particular, FIG. 3 illustrates a sub-process 300 that DTKV service 104-X can execute after block 214 of FIG. 2, but before block 216. With this sub-process, DTKV service 104-X can avoid aborting the subject modifier transaction if there is no overlap in key-value pairs between the modifier transaction and other, concurrent modifier transactions.

Sub-process 300 begins after DTKV service 104-X has determined that the append operation has failed for the current key-value subset (e.g., block 214 of FIG. 2). At block 302, DTKV service 104-X can retrieve the length of the data log file associated with the current key value subset. As noted with respect to block 202 of FIG. 2, this data log file length is stored in the data log snapshot and reflects the length of the data log file at the beginning of the modifier transaction.

At block 304, DTKV service 104-X can read the data log file backwards from the end of file to the length retrieved at block 302. In a particular embodiment, DTKV service 104-X can carry out this reading by invoking the read operation exposed by DFS component 114-X and described in Section I.D. By reading the file in this manner, DTKV service 104-X can identify the key-value pairs that were added to the file between the time at which the modifier transaction started and the time at which the append operation failed.

If DTKV service 104-X finds a match between any keys read from the data log file at block 304 and the keys in the current key-value subset (block 306), DTKV service 104-X can determine that there is an overlap between the key-value pairs of the modifier transaction and the key-values pairs of another, concurrent transaction. Accordingly, at block 308, DTKV service 104-X can write (via the append operation exposed by DFS component 114-X) a second transaction log entry to transaction log file 108-X (e.g., an ABORT transaction log entry) indicating that the modifier transaction is aborted.

On the other hand, if DTKV service 104-X does find any match at block 306, DTKV service 104-X can determine that there is no overlap between the key-value pairs of the modifier transaction and the key-value pairs of other, concurrent transactions. In this case, DTKV service 104-X can update the data log snapshot to include the current version number and current length of the data log file (block 310). DTKV service 104-X can then allow sub-process 300 to transition to block 212 of FIG. 2. At block 212, DTKV service 104-X can retry the append operation for the data log file with the current version number, and process 200 can proceed from that point as previously described.

Although not shown in FIG. 2 or FIG. 3, in some embodiments DTKV service 104-X can automatically retry (i.e., restart execution of) a modifier transaction after it has been aborted. This can increase the likelihood that the modifier transaction will complete successfully. In a particular embodiment, an administrator of DTKV store 100 can define one or parameters indicating whether DTKV service 104-X should attempt such retries, and if so, the maximum number of retries per transaction.

II.B. GET Transactions

Figure 4:
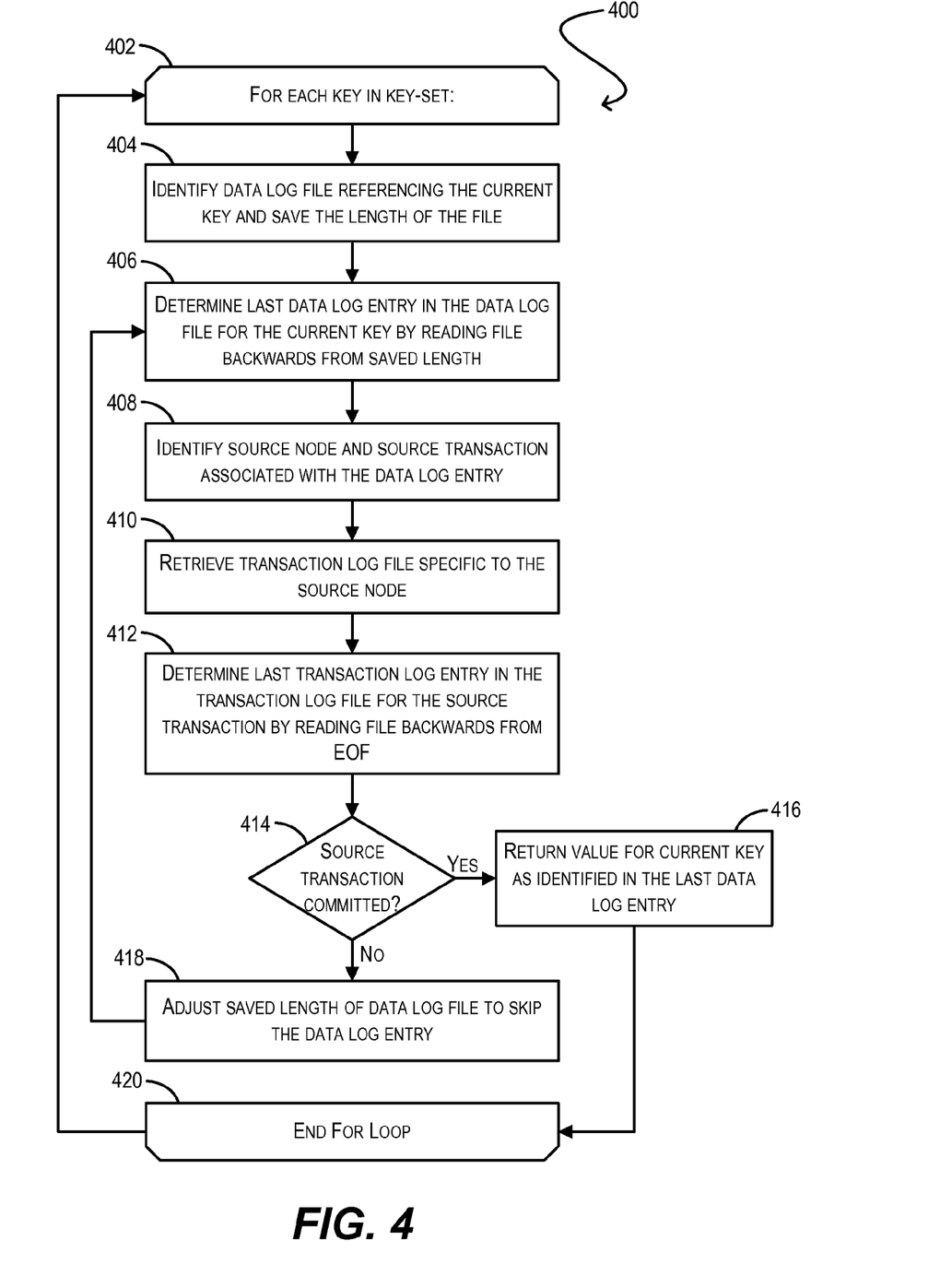
FIGS. 4 and 5 illustrate processes for executing a GET transaction according to various embodiments.

FIG. 4 illustrates a process 400 that can be performed by DTKV service 104-X for executing a retrieval (i.e., GET) transaction in accordance with one embodiment.

At block 402, DTKV service 104-X can enter a loop for each key in the key-set (i.e., set of input keys) of the GET transaction. Within this loop, DTKV service 104-X can first identify the data log file that stores the current key and save the length of the data log file (block 404).

At block 406, DTKV service 104-X can search the data log file identified at block 404 for the last (i.e., most recent) data log entry that references the current key. As noted in Section I.C.1., the last data log entry in a data log file for a given key will generally reflect the current value of that key. In a particular embodiment, DTKV service 104-X can carry out this search by reading the data log file backwards (from the length value at block 404) using the read operation exposed by DFS component 114-X and described in Section I.D.

Once DTKV service 104-X finds the last data log entry for the current key, DTKV service 104-X can identify, using the "node" and txnID" fields of the data log entry, the source node and source transaction that caused the data log entry to be created (block 408). DTKV service 104-X can then retrieve the transaction log file associated with source node and search the transaction log file for the last (i.e., most recent) transaction log entry that references the source transaction ID (blocks 410 and 412). In this manner, DTKV service 104-X can determine the current state of the source transaction.

If the last transaction log entry for the source transaction is a COMMIT entry (block 414), DTKV service 104-X can determine that the last data log entry determined at block 406 is valid, and thus can return the value identified in the last data log entry as the current value of the current key (block 416). Process 400 can then end.

On the other hand, if the last transaction log entry is not a COMMIT entry, DTKV service 104-X can determine the last data log entry determined at block 406 is not valid because the source transaction that created the last data log entry has not yet been committed. Accordingly, DTKV service 104-X can adjust the saved length of the data log file to skip the last data log entry (block 418). The flow of process 400 can then return to block 406, such that DTKV service 104-X searches the data log file again for the last (i.e., most recent) data log entry that references the current key. In this subsequent search, DTKV service 104-X will not encounter the previously found data log entry, since DTKV service 104-X will read the file backwards from the new saved length (which skips the previously found data log entry). Process 400 can then continue as described above.

Eventually, DTKV service 104-X can find a valid data log entry for the current key and return the value from that data log entry at block 416. Loop 402 can then proceed to process the remaining keys in the key-set until DTKV service 104-X has returned a value for every key.

Intuitively, the algorithm of FIG. 4 ensures that a GET transaction does not return a value for a specified key unless the modifier transaction that added that value to DTKV store 100 is marked as being committed in the appropriate transaction log file. Thus, this algorithm guarantees the atomicity of modifier transactions in the sense that, if a modifier transaction is interrupted or fails for any reason prior to the creation a COMMIT transaction log entry, any intermediate data log entries that the modifier transaction created prior to the failure will be invisible to users.

However, the algorithm of FIG. 4 does not guarantee per-node-snapshot isolation for GET transactions in the face of concurrent modifier transactions. For example, assume that a PUT transaction T1 is initiated for storing key-value pairs (K1, W1) and (K2, W2), where the previous values for keys K1 and K2 were V1 and V2 respectively. Further, assume that a GET transaction T2 is initiated for reading the values of keys K1 and K2 at substantially the same time as transaction T1, such that the following sequence of events occur:

1. T1 is started
2. T1 causes key K1 to be updated with value W1
3. T1 causes key K2 to be updated with value W2
4. T2 is started
5. T2 searches for the last data log entry for key K1 and finds value W1, but checks the appropriate transaction log file and does not find a COMMIT transaction log entry for T1 (since T1 has not been committed yet); as a result, T2 searches for an earlier data log entry for key K1, finds value V1, and returns V1
6. T1 is committed and a COMMIT transaction log entry is written
7. T2 searches for the last data log entry for key K2, finds value W2, finds a COMMIT transaction log entry for T1, and returns W2

At the end of this sequence, GET transaction T2 returns values V1 and W2 for keys K1 and K2 respectively, which violates the property of per-node-snapshot isolation because the resulting values reflect partial execution of PUT transaction T1.

Figure 5:
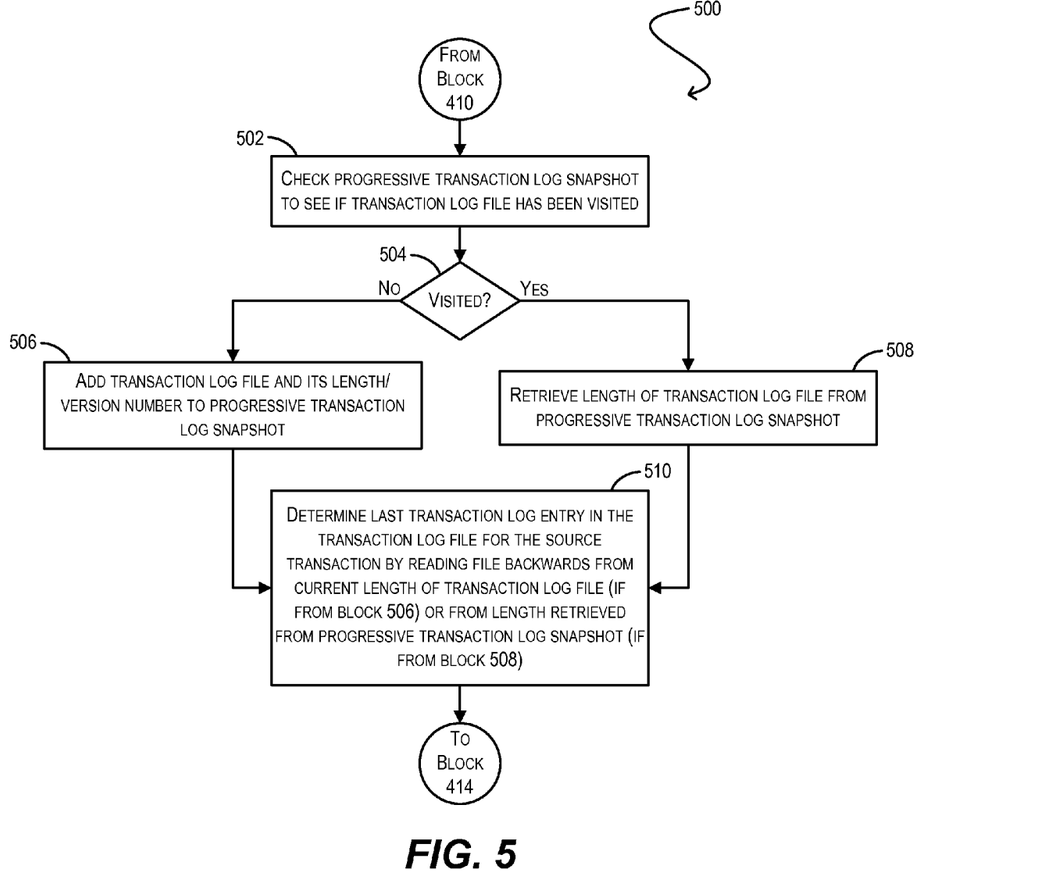

To address this shortcoming, in certain embodiments process 400 of FIG. 4 can be enhanced as shown in FIG. 5. In particular, FIG. 5 illustrates a sub-process 500 that DTKV service 104-X can perform between blocks 410 and 414 of FIG. 4. With sub-process 500, DTKV service 104-X can ensure that a GET transaction does not return results reflecting partial execution of one or more concurrent modifier transactions.

Sub-process 500 begins after DTKV service 104-X has retrieved the transaction log file for the source transaction associated with the last data log entry of the current key (at block 410 of FIG. 4). At block 502, DTKV service 104-X can access a "progressive transaction log snapshot," which is a data structure intended to keep track of all transaction log files (and their version numbers and lengths) visited during the course of a single GET transaction. In particular, DTKV service 104-X can access this progressive transaction log snapshot to determine whether DTKV service 104-X previously visited (e.g., read) the transaction log file retrieved at block 410 during the current GET transaction.

If DTKV service 104-X determines that it has not previously visited the transaction log file (block 504), DTKV service 104-X can add the transaction log file and its current length/version number to the progressive transaction log snapshot (block 506). On the other hand, if DTKV service 104-X determines that it has previously visited the transaction log file, DTKV service 104-X can read the length of the transaction log file from the progressive transaction log snapshot (block 508). DTKV service 104-X can then search the transaction log file for the last transaction log entry referencing the source transaction ID (block 510). DTKV service 104-X can perform this searching by reading the file backwards from the current length of the transaction log file (if block 506 was performed) or from the length retrieved from the progressive transaction log snapshot (if block 508 was performed). Sub-process 500 can then transition to block 414 of FIG. 4, and process 400 can proceed from that point as previously described.

By utilizing a progressive transaction log snapshot in the manner shown in FIG. 5, DTKV service 104-X can effectively "freeze" the state of the transaction log files it accesses during the course of a GET transaction. Thus, DTKV service 104-X can avoid scenarios where the GET transaction returns transactionally incorrect results (e.g., results that do not satisfy per-node-snapshot isolation) due to one or more concurrent modifier transactions. For example, if sub-process 500 is applied to the previous example scenario in which PUT transaction T1 executes concurrently with GET transaction T2, the following alternative sequence of events occurs:

1. T1 is started
2. T1 causes key K1 to be updated with value W1
3. T1 causes key K2 to be updated with value W2
4. T2 is started
5. T2 searches for the last data log entry for key K1 and finds value W1, but searches the appropriate transaction log file and does not find a COMMIT transaction log entry for T1 (since T1 has not been committed yet); as a result, T2 searches for an earlier data log entry for key K1, finds value V1, and returns V1
6. T2 adds the visited transaction log file and its length to the progressive transaction log snapshot 7. T1 is committed and a COMMIT transaction log entry is written
8. T2 searches for the last data log entry for key K2 and finds value W2, determines that the appropriate transaction log file was previously visited and thus searches the transaction log file from the length saved in the progressive transaction log snapshot
9. T2 does not find an COMMIT transaction log entry for T1 in the transaction log snapshot (since the COMMIT written at step (7) is skipped), searches for an earlier data log entry for key K2, finds value V2, and returns V2

At the end of this sequence, GET transaction T2 returns values V1 and V2 for keys K1 and K2 respectively, which is transactionally correct because it does not reflect partial execution of PUT transaction T1.

III. Searches by Key Namespace

As noted previously, in certain embodiments DTKV store 100 can support the efficient searching of stored keys and/or key-value pairs. In particular, DTKV store 100 can partition keys into one or more key namespaces and store the key-value pairs for each key namespace in one or more separate data log files. DTKV services 104-1 to 104-N can then allow users to search (via the SEARCH operation described in section I.A.) for keys and/or key-value pairs by key namespace. When a user invokes the SEARCH operation in the context of a particular key namespace, the DTKV store can restrict its searching to the contents of the data log file(s) associated with that key namespace (rather than having to search all of the data log files in DTKV store 100).

Figure 6:
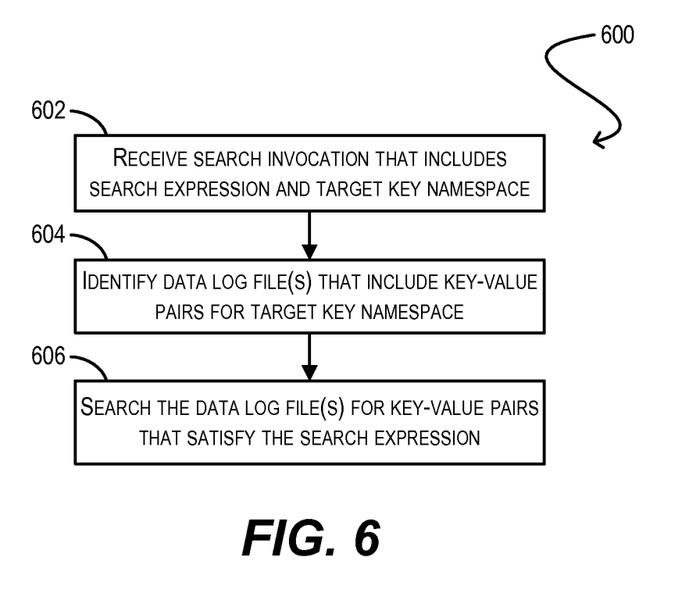
FIG. 6 illustrates a process for executing searches by key namespace according to one embodiment.

FIG. 6 illustrates a process 600 that can be performed by DTKV service 104-X for executing the SEARCH operation according to one embodiment. At block 602, DTKV service 104-X can receiving an invocation of the SEARCH operation that includes a search expression and a target key namespace. The search expression can be, e.g., a regular expression or any other type of query string.

At block 604, DTKV service 104-X can identify one or data log files that are associated with the target key namespace (i.e., include key-value pairs for the target key namespace).

At block 606, DTKV service 104-X can search the one or more data log files identified at block 604 for keys and/or key-value pairs that satisfy the search expression. DTKV service 104-X can then return the discovered keys and/or key-value pairs to the requestor. In one embodiment, DTKV service 104-X can perform this searching by invoking the read operation exposed by its associated DFS component 114-X and described in Section I.D. In alternative embodiments, this searching can be performed using any known text searching algorithm.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

Further, boundaries between the various components, operations and data stores described herein are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:
1. A system for implementing a distributed, transactional key-value store, the system comprising:
  a set of nodes, wherein each node is communicatively coupled with one or more storage devices storing a set of data log files, each data log file including key-value pairs for a key namespace,
  wherein each node is configured to execute, using a transaction log file specific to the node, transactions for modi- fying or retrieving key-value pairs in the set of data log files, the transaction log file including state information for the transactions, and wherein the transactions are executed in a manner that ensures atomicity and durability of each transaction.

2. The system of claim 1 wherein the transaction log file specific to each node is stored on a local storage device of the node.

3. The system of claim 1 wherein the transaction log file specific to each node indicates whether each transaction has been initiated, committed, or aborted by the node.

4. The system of claim 1 wherein the transaction log file specific to each node is readable and writable by the node, but is only readable by other nodes in the set of nodes.

5. The system of claim 1 wherein each node is configured to execute the transactions in a manner that further ensures per-node-snapshot isolation of each transaction.

6. The system of claim 1 wherein each node is further configured to search the set of data log files in response to a search operation that includes a search expression and a target key namespace, the searching comprising:
- identifying a data log file in the set of data log files that includes key-value pairs for the target key namespace; and
- searching the data log file for key-value pairs that satisfy the search expression.

7. The system of claim 1 wherein each node is configured to execute a transaction that modifies one or more key-value pairs in the set of data log files by:
- determining a data log snapshot, wherein the data log snapshot identifies one or more data log files in the set data log files that the node will access due to the transaction, and wherein the data log snapshot includes, for each of the one or more data log files, a version number and size; and
- determining one or more key-value subsets, wherein each key-value subset includes key-value pairs from an associated data log file in the one or more data log files that the node will attempt to modify due to the transaction.

8. The system of claim 7 wherein the node is configured to execute the transaction by further:
- determining a transaction identifier for the transaction;
- writing a first transaction log entry to the transaction log file specific to the node, the first transaction log entry including the transaction identifier and indicating that the modifier transaction has been initiated; and
- for each key-value subset in the one or more key-value subsets, attempting to append one or more data log entries to the key-value subset's associated data log file, each data log entry identifying a modification to a key-value pair in the key-value subset's associated data log file.

9. The system of claim 8 wherein attempting to append the one or more data log entries to the key-value subset's associated data log file comprises:
- retrieving the version number of the key-value subset's associated data log file from the data log snapshot; and
- invoking an append operation that takes the version number as an input parameter,
- wherein the append operation succeeds if the version number matches a current version number of the key-value subset's associated data log file, and
- wherein the append operation fails if the version number does not match the current version number.

10. The system of claim 9 wherein the node is configured to execute the transaction by further:
- if the append operation succeeds for each key-value subset in the one or more key-value subsets, writing a second transaction log entry to the transaction log file specific to the node, the second transaction log entry including the transaction identifier and indicating that the modifier transaction has been committed.

11. The system of claim 9 wherein the node is configured to execute the transaction by further:
- if the append operation fails for any key-value subset in the one or more key-value subsets, writing a second transaction log entry to the transaction log file specific to the node, the second transaction log entry including the transaction identifier and indicating that the modifier transaction has been aborted.

12. The system of claim 9 wherein the append operation is implemented by a distributed file system (DFS) component running on the node, and wherein the append operation is guaranteed by the distributed file system to be atomic.

13. The system of claim 9 wherein attempting to append the one or more data log entries to the key-value subset's associated data log file further comprises:
- if the append operation fails:
  - retrieving the length of the key-value subset's associated data log file from the data log snapshot;
  - reading the key-value subset's associated data log file backwards from the end of the file to the retrieved length;
  - as the key-value subset's associated data log file is read, determining whether any keys in the key-value subset's associated data log file match keys in the key-value subset;
  - if a match is found, determining that the transaction should be aborted; and
  - if a match is not found:
    - updating the data log snapshot to include a current version number and a current length of the key-value subset's associated data log file; and
    - re-invoking the append operation by passing in the current version number.

14. The system of claim 1 wherein each node is configured to execute a transaction that retrieves one or more key-value pairs in the set of data log files by:
- for each key-value pair in the one or more key-value pairs:
  - identifying a data log file in the set of data log files that includes the key-value pair;
  - saving a length of the data log file; and
  - processing the data log file by:
    - determining a data log entry in the data log file that represents the most recent modification of the key-value pair, the determining being based on the saved length of the data log file;
    - identifying a source node and a source transaction associated with the data log entry;
    - retrieving a transaction log file specific to the source node;
    - determining a transaction log entry in the transaction log file specific to the source node that represents a current state of the source transaction;
    - if the transaction log entry indicates that the source transaction has been committed, returning the key-value pair as identified in the data log entry; and
    - if the transaction log entry does not indicate that the source transaction has been committed:
      - adjusting the saved length of the data log file to skip the data log entry; and
      - re-processing the data log file based on the adjusted saved length.

15. The system of claim 14 wherein the node is configured to execute the transaction by further:

prior to determining the transaction log entry, retrieving a length of the transaction log file from a progressive transaction log snapshot, the progressive transaction log snapshot identifying transaction log files accessed by the node during the transaction and their corresponding lengths at the time of access, wherein determining the transaction log entry is based on the retrieved length.

16. The system of claim 1 wherein each data log file and transaction log file is compacted at predetermined time intervals or upon reaching a predetermined size.

17. A method performed by a node in a set of nodes, the node being communicatively coupled with one or more storage devices storing a set of data log files, each data log file including key-value pairs for a key namespace, the method comprising:

executing, by the node using a transaction log file that is specific to the node, transactions for modifying or retrieving key-value pairs in the set of data log files, the transaction log file including state information for the transactions, wherein the transactions are executed in a manner that ensures atomicity and durability of each transaction.

18. The method of claim 17 wherein the transactions are executed in a manner that further ensures per-node-snapshot isolation of each transaction.

19. A non-transitory computer readable medium embodying computer software, the computer software being executable by a node in a set of nodes, the node being communicatively coupled with one or more storage devices storing a set of data log files, each data log file including key-value pairs for a key namespace, the computer software causing the node to perform a method comprising:

executing, using a transaction log file that is specific to the node, transactions for modifying or retrieving key-value pairs in the set of data log files, the transaction log file including state information for the transactions, wherein the transactions are executed in a manner that ensures atomicity and durability of each transaction.

20. The non-transitory computer readable medium of claim 19 wherein the transactions are executed in a manner that further ensures per-node-snapshot isolation of each transaction.

\* \* \* \* \*